United States Patent
Tang et al.

(10) Patent No.: US 10,067,372 B2
(45) Date of Patent: Sep. 4, 2018

(54) LCD IMPROVING COLOR SHIFT AT LARGE VIEWING ANGLE

(71) Applicants: Shenzhen China Star Optoelectronics Technology Co., Ltd., Shenzhen (CN); WUHAN CHINA STAR OPTOELECTRONICS TECHNOLOGY CO., LTD., Wuhan, Habei (CN)

(72) Inventors: Yuejun Tang, Shenzhen (CN); Dejiun Li, Shenzhen (CN); Hongqing Cui, Shenzhen (CN); Tsungying Yang, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 218 days.

(21) Appl. No.: 14/896,676

(22) PCT Filed: Nov. 20, 2015

(86) PCT No.: PCT/CN2015/095130
§ 371 (c)(1),
(2) Date: Dec. 8, 2015

(87) PCT Pub. No.: WO2017/079992
PCT Pub. Date: May 18, 2017

(65) Prior Publication Data
US 2017/0192296 A1    Jul. 6, 2017

(30) Foreign Application Priority Data

Nov. 12, 2015  (CN) .......................... 2015 1 0777556

(51) Int. Cl.
*G02F 1/1335* (2006.01)
*G02F 1/1362* (2006.01)

(52) U.S. Cl.
CPC .. *G02F 1/133512* (2013.01); *G02F 1/133514* (2013.01); *G02F 1/136286* (2013.01)

(58) Field of Classification Search
None
See application file for complete search history.

(56) References Cited

U.S. PATENT DOCUMENTS 7,643,110 B2 *   1/2010   Kawashima ...... G02F 1/133512
                                                                        349/104
7,646,445 B2 *   1/2010   Kim .................. G02F 1/134336
                                                                        345/88

(Continued)

*Primary Examiner* — Edward Glick
*Assistant Examiner* — David Chung
(74) *Attorney, Agent, or Firm* — JMB Davis Ben-David

(57) ABSTRACT

An LCD includes a backlight module, an array substrate, and a color filter layer. The color filter layer includes a first filter unit, a second filter unit and a black matrix unit. A transmittance rate of the second filter unit is larger than that of the first filter unit. The black matrix layer is connected between the first filter unit and second filter unit. The width of the black matrix unit is larger than that of the third black matrix unit. The width of the black matrix unit facing the first filter unit is larger than that of the black matrix unit facing the second filter unit. This kind of asymmetrical black matrix layer not only best prevents lowering the pixel aperture ratio, but also improves color shift of images when light goes through pixels of low transmittance as pixels of high transmittance are turned off.

12 Claims, 4 Drawing Sheets

(56) References Cited

U.S. PATENT DOCUMENTS

| | | | |
|---|---|---|---|
| 8,269,925 B2* | 9/2012 | Ochiai | G02F 1/133512 349/106 |
| 9,104,078 B2* | 8/2015 | Kajita | G02F 1/136209 |
| 2009/0290080 A1* | 11/2009 | Horiuchi | G02B 5/201 349/38 |
| 2015/0286097 A1* | 10/2015 | Lee | G02F 1/133617 349/61 |
| 2016/0342058 A1* | 11/2016 | Park | G02F 1/136286 |

* cited by examiner

LCD IMPROVING COLOR SHIFT AT LARGE VIEWING ANGLE

CROSS-REFERENCE TO RELATED APPLICATIONS

This is the U.S. National Stage of International Application No. PCT/CN2015/095130, filed Nov. 20, 2015, which in turn claims the benefit of China Patent Application No. 201510777556.6, filed Nov. 12, 2015.

BACKGROUND OF THE INVENTION

1. Field of the Invention

The present invention relates to a liquid crystal display (LCD), and more specifically, to a LCD that improves color shift at large viewing angle by adjusting the width of black matrix layers.

2. Description of the Prior Art

As display technology advances, people pay more and more attention to the display quality of display devices, which are developing wider viewing angles. However, a liquid crystal display (LCD) with a wide viewing angle usually has a problem: color shift at large viewing angles. It is mainly because of light leakage of adjacent pixels that affects color purity shown by pixels. For example, when the LCD shows a red image, the light goes through red pixels and adjacent green pixels are turned off. But some light still goes through the green pixels and thus the red image, when seen from a large viewing angle, has a yellowish color.

In addition, the resolution of LCDs gets higher and higher, and the area of pixels becomes smaller and smaller. To maintain a specific transmittance rate of pixels and prevent energy consumption increase or brightness reduction, the width of a black matrix between two pixels of LCDs has become narrower and narrower. However, during the process of manufacturing a LCD, a minor mismatch of a color filter substrate and array substrate will result in the shifting of black matrixes. Therefore, from a large viewing angle, viewers will still see color shift resulted from the light leakage of adjacent pixels.

SUMMARY OF THE INVENTION

An object of the present invention is mainly to solve the technical problem of color shift of images at a large viewing angle resulted from the light leakage of adjacent pixels.

According to the present invention, a liquid crystal display (LCD), comprises: a backlight module for emitting light; an array substrate disposed on the backlight module, comprising a plurality of data lines, comprising a first data line, a second data line and a third data line for transmitting data signals; a black matrix layer for preventing light leakage; a liquid crystal layer, disposed between the black matrix layer and the array substrate, comprising liquid crystal molecules for controlling the twist of liquid crystal molecules based on the data signals; and a color filter layer. The color filter layer comprises: a first filter unit for producing light of a first color when light passes through, a second filter unit for producing light of a second color when light passes through, of transmittance rate larger than that of the first filter unit, and a third filter unit, for producing light of a third color when light passes through, of transmittance rate larger than that of the first filter unit. The black matrix layer comprises: a first black matrix unit, corresponding to the joint of the first and second filter units; a second black matrix unit, corresponding to the joint of the second and third filter units; a third black matrix unit, corresponding to the joint of the first and third filter units; the width of the first black matrix unit is larger than that of the third black matrix unit. The width of the second black matrix unit is larger than that of the third black matrix unit, and the width of the first black matrix unit is larger than that of the second black matrix unit.

In one aspect of the present invention, the first black matrix unit aligns to a first data line and bases on the center line of the first data line, and the width of the first black matrix unit facing the second filter unit is larger than that facing the first filter unit.

In another aspect of the present invention, the second black matrix unit aligns to a second data line and bases on the center line of the second data line, and the width of the second black matrix unit facing the second filter unit is larger than that facing the third filter unit.

In another aspect of the present invention, the first black matrix unit connects between the first and second filter units, the second black matrix unit connects between the second and third filter units, and the third black matrix unit connects the first and third filter units.

In still another aspect of the present invention, the first black matrix unit faces but does not contact the joint of the first and second filter units, the second black matrix unit faces but does not contact the joint of the second and third filter units, and the third black matrix unit faces but does not contact the joint of the first and third filter units.

In yet another aspect of the present invention, the first filter unit is a red filter unit, the second filter unit is a green or white filter unit, and the third filter unit is a blue filter unit.

According to the present invention, a liquid crystal display (LCD), comprises: a backlight module for emitting light; an array substrate disposed on the backlight module, comprising a plurality of data lines, comprising a first data line, a second data line and a third data line for transmitting data signals; a black matrix layer for preventing light leakage; a liquid crystal layer, comprising liquid crystal molecules, for controlling the twist of liquid crystal molecules based on the data signals; and a color filter layer. The color filter layer comprises: a first filter unit for producing light of a first color when light passes through, a second filter unit for producing light of a second color when light passes through, of transmittance rate larger than that of the first filter unit, a third filter unit for producing light of a third color when light passes through, of transmittance rate larger than that of the first filter unit. The black matrix layer comprises: a first black matrix unit, corresponding to the joint of the first and second filter units; a second black matrix unit, corresponding to the joint of the second and third filter units; a third black matrix unit, corresponding to the joint of the first and third filter units; the width of the first black matrix unit is larger than that of the third black matrix unit.

In one aspect of the present invention, the width of the second black matrix unit is larger than that of the third black matrix unit.

In another aspect of the present invention, the width of the first black matrix unit is larger than that of the second black matrix unit.

In another aspect of the present invention, the liquid crystal layer is disposed between the black matrix layer and the array substrate.

In another aspect of the present invention, the first black matrix unit aligns to a first data line and bases on the center line of the first data line, and the width of the first black matrix unit facing the second filter unit is larger than that facing the first filter unit.

In another aspect of the present invention, the second black matrix unit aligns to a second data line and bases on the center line of the second data line, and the width of the second black matrix unit facing the second filter unit is larger than that facing the third filter unit.

In another aspect of the present invention, the first black matrix unit connects between the first and second filter units, the second black matrix unit connects between the second and third filter units, and the third black matrix unit connects the first and third filter units.

In another aspect of the present invention, the first black matrix unit faces but does not contact the joint of the first and second filter units, the second black matrix unit faces but does not contact the joint of the second and third filter units, and the third black matrix unit faces but does not contact the joint of the first and third filter units.

In still another aspect of the present invention, the black matrix layer is disposed between the liquid crystal layer and the array substrate.

In yet another aspect of the present invention, the first filter unit is a red filter unit, the second filter unit is a green or white filter unit, and the third filter unit is a blue filter unit.

Comparing to current technology, the present invention provides a LCD with an asymmetrical black matrix layer. The width of the black matrix unit on both sides of the filter unit of high transmittance rate (e.g. green or white filter unit) is larger than that of the black matrix unit between two filter unit of low transmittance rate (e.g. red or blue filter unit). More specifically, when the asymmetrical black matrix layer locates on the side that is away from the backlight module (i.e. close to viewers), the width of the black matrix unit facing the filter unit of high transmittance rate is larger than that of the black matrix unit facing the filter unit of low transmittance rate. When the asymmetrical black matrix layer locates on the side that is closer to the backlight module (i.e. away from viewers), the width of the black matrix unit facing the filter unit of low transmittance rate is larger than that of the black matrix unit facing the filter unit of high transmittance rate. This kind of asymmetrical black matrix layer not only best prevents lowering the pixel aperture ratio, but also improves color shift of images when light goes through pixels of low transmittance as pixels of high transmittance are turned off.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE PREFERRED EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 1:
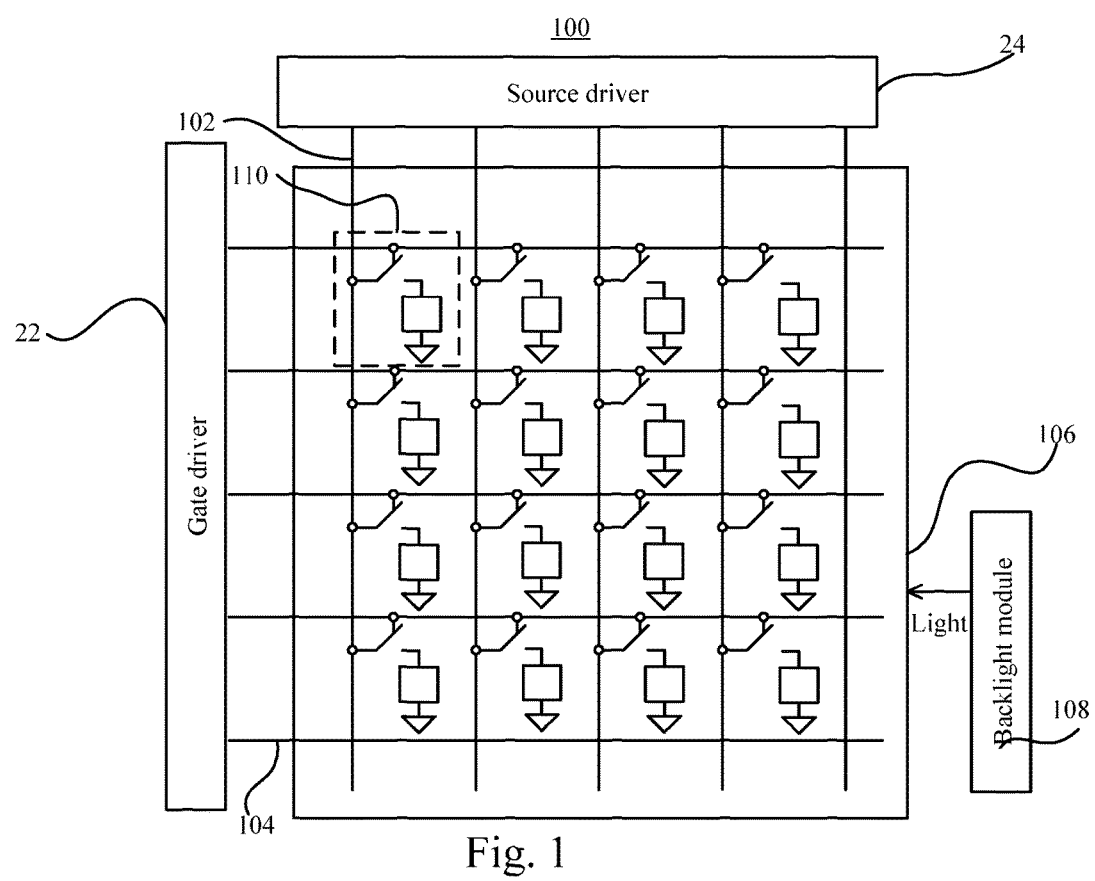
FIG. 1 is a schematic diagram of a LCD of the present invention.
Figure 2:
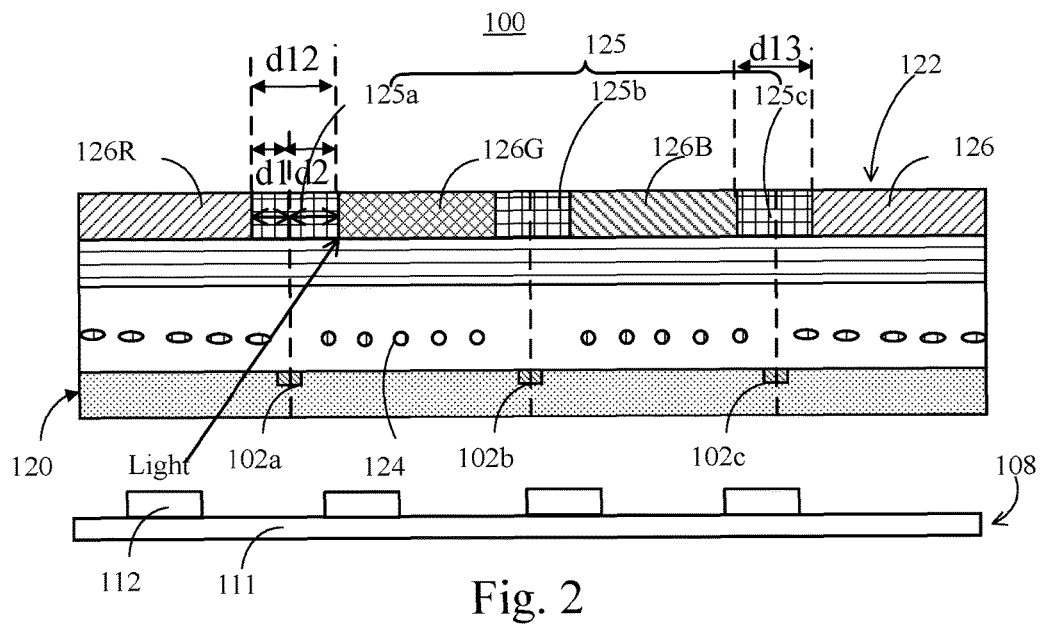
FIG. 2 is a cross-sectional view of the LCD of a first embodiment of the present invention.

Please refer to FIG. 1 and FIG. 2. FIG. 1 is a schematic diagram of a LCD 100 of the present invention. FIG. 2 is a cross-sectional view of the LCD 100 of a first embodiment of the present invention. The LCD 100 of the present invention comprises a LCD panel 106 and a backlight module 108. The LCD panel 106 comprises an array substrate 120, a color filter layer 122 and a liquid crystal layer 124. The liquid crystal layer 124 locates between the array substrate 120 and color filter layer 122. The color filter layer 122 comprises a black matrix layer 125 and a color film layer 126. The LCD panel 106, through the color film layer 126, separates the light into three primary colors, red, green and blue, so to show color images. The black matrix layer 125 is for preventing light leakage. The array substrate 120 comprises a plurality of data lines 102, scan lines 104 and pixel units 110 arranged in arrays. Each pixel unit 110 electrically connects to one data line 102 and one scan line 104. The backlight module 108 comprises a substrate 111 and a plurality of backlight sources 112, which are disposed on the substrate 111. The plurality of backlight sources 112 can be light-emitting diodes (LED), organic LED (OLED) or quantum dots (QD). The LCD of the present invention can be applied to flat or curved display device. When the LCD 100 applies to a curved display device, the LCD panel 106 and backlight module 108 appear in a curved shape, with the former being disposed on the latter.

A method for driving the LCD panel 106 is as follows: a scan signal is outputted by the gate driver 22 and inputs through scan line 104, so that a pixel unit 110 connected to the scan line 104 receives data signals outputted by the source driver 24, thus is charged with necessary voltage. Liquid crystals above the pixel unit 110 twist according to the data signal, and further display different grey-scale images. The gate driver 22 outputs scan signals line by line through a plurality of scan lines 104, and then the gate driver 24 charges or discharges pixel units 110 of each line. Following the sequence, a full display of the LCD panel 106 can be completed.

As shown in FIG. 2, the color filter layer 122 and color film layer 126 can comprise red filter unit 126R, green filter unit 126G and blue filter unit 126B. The LCD panel 106 separates the light into red, green and blue colors through the red filter unit 126R, green filter unit 126G and blue filter unit 126B, and shows color images. Generally speaking, the transmittance rate of the red filter unit 126R is smaller than that of the green filter unit 126G but larger than that of the blue filter unit 126B. The transmittance ratio of the green filter unit 126G, red filter unit 126R and blue filter unit 126B of one of the display device is approximately 3.7:1.4:1. Therefore, the present embodiment takes the red filter unit 126R as first filter unit of low transmittance rate, the green filter unit 126G as second filter unit of high transmittance rate, and blue filter unit 126B as third filter unit of low transmittance. However, the transmittance rate of the third filter unit is still lower than that of the first filter unit. In FIG. 2, the green filter unit 126G is disposed between the red filter unit 126R and the blue filter unit 126B.

The black matrix layer 125 comprises a plurality of black matrix units comprising black matrix units 125a, 125b, and 125c. The black matrix unit 125a connects between the green filter unit 126G and red filter unit 126R and aligns to a data line 102a; the black matrix unit 125b connects between the green filter unit 126G and the blue filter unit 126B and aligns to a data line 102b; the black matrix unit 125c connects between the red filter unit 126R and blue filter unit 126B and aligns to a data line 102c. The width d12 of the black matrix unit 125a is larger than the width d13 of the black matrix unit 125c. More specifically, the black matrix unit 125a bases on the center line of the data line 102a to which it aligns to. The width d2 of the black matrix unit 125a facing the green filter unit 126G is larger than the width d1 of the black matrix unit 125a facing the red filter unit 126R. Given that the width d2 is larger than width d1, the light leaked from the green filter unit 126G is less when viewers see from the right large viewing angle. For example, when a red image is displayed, liquid crystal molecules under the red filter unit 126R twist because of data voltage of the data line 102a, so that light can go through the red filter unit 126R which filters red light. At the same time, part of the light going through the liquid crystal molecules under the red filter unit 126R is blocked by the black matrix unit 125a and cannot pass the green filter unit 126G. Given that the width d2 of the black matrix unit 125a is larger, it can easily block the light going through the liquid crystal molecules under the red filter unit 126R and beaming to the green filter unit 126G by the large viewing angle, stopping the light from passing the green filter unit 126G. Therefore, from the large viewing angle, viewers see red image that are purely red with no green light involved.

Figure 3:
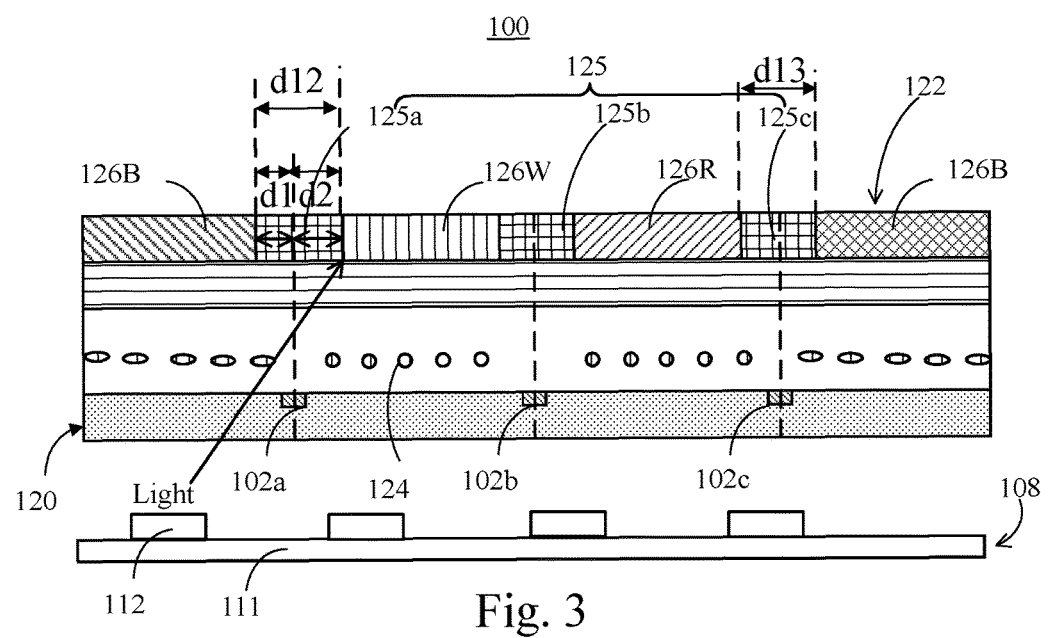
FIG. 3 is a cross-sectional view of the LCD of the second embodiment of the present invention.

Please refer to FIG. 3. FIG. 3 is a cross-sectional view of the LCD 100 of the second embodiment of the present invention. The color filter layer 126 can comprise a white filter unit 126W, a red filter unit 126R and a blue filter unit 126B. The transmittance rate of the white filter unit 126W that filters the white light is larger than the red filter unit 126R and blue filter unit 126B. Therefore, the white filter unit 126W and green filter unit 126G can serve as the second filter unit of high transmittance rate. The white filter unit 126W is between the red filter unit 126R and blue filter unit 126B.

The black matrix layer 125 comprises a plurality of black matrix units comprising black matrix units 125a, 125b, and 125c. The black matrix unit 125a connects between the white filter unit 126W and blue filter unit 126B and aligns to a data line 102a; the black matrix unit 125b connects between the white filter unit 126W and the red filter unit 126R and aligns to a data line 102b; the black matrix unit 125c connects between the blue filter unit 126B and red filter unit 126R and aligns to a data line 102c. The width d12 of the black matrix unit 125a is larger than the width d13 of the black matrix unit 125c. More specifically, the black matrix unit 125a bases on the center line of the data line 102a to which it aligns to. The width d2 of the black matrix unit 125a facing the white filter unit 126W is larger than the width d1 of the black matrix unit 125a facing the blue filter unit 126B. Given that the width d2 is larger than width d1, the light leaked from the white filter unit 126W is less when viewers see from the right large viewing angle. For example, when a blue image is displayed, liquid crystal molecules under the blue filter unit 126B twist because of data voltage of the data line 102a, so that light can go through the blue filter unit 126B which filters red light. At the same time, part of the light going through the liquid crystal molecules under the blue filter unit 126B is blocked by the black matrix unit 125a and cannot pass the white filter unit 126W. Given that the width d2 of the black matrix unit 125a is larger, it can easily block the light going through the liquid crystal molecules under the blue filter unit 126B and beaming to the white filter unit 126W by the large viewing angle, stopping the light from passing the white filter unit 126W. Therefore, from the large viewing angle, viewers see blue image that are purely blue with no white light involved.

Figure 4:
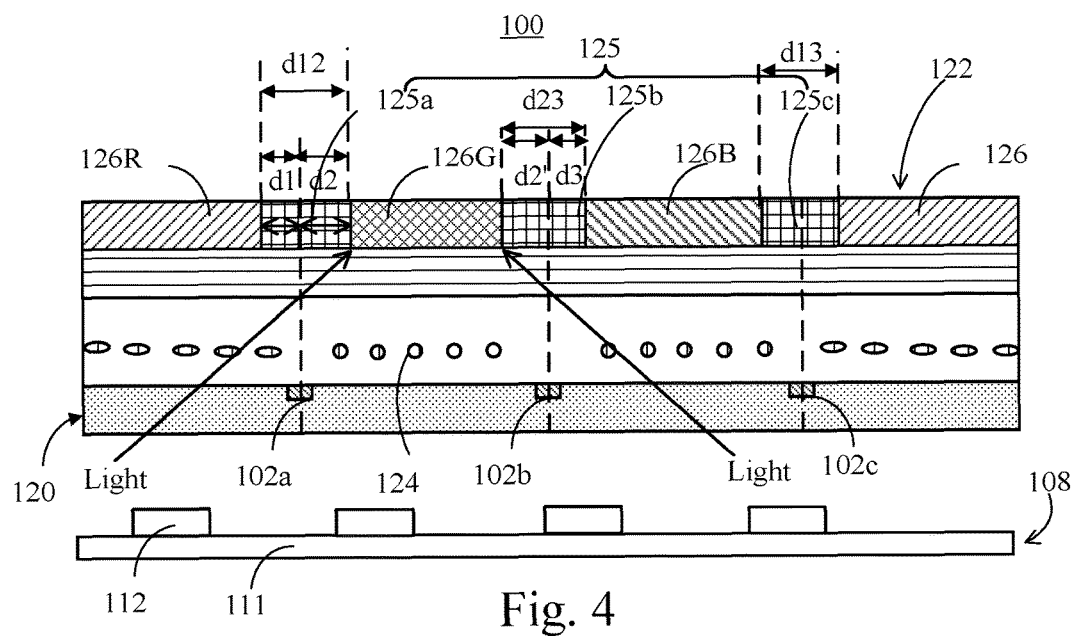
FIG. 4 is a cross-sectional view of the LCD of a third embodiment of the present invention.

Please refer to FIG. 4. FIG. 4 is a cross-sectional view of the LCD 100 of a third embodiment of the present invention. Items in FIG. 4 marked with numbers the same as those in FIG. 2 have the same functions, so no further explanation is provided here. A width d13 of the black matrix unit 125c is smaller than not only a width d12 of the black matrix unit 125a, but also a width d23 of the black matrix unit 125b. A width d2 of the black matric unit 125a facing the green filter unit 126G is larger than a width d1 of the black matric unit 125a facing the red filter unit 126R. The black matrix unit 125b aligns to and bases on the center line of the data line 102b, with a width d2' facing the green filter unit 126G larger than a width d3 facing the blue filter unit 126B. The width d2' can equal to the width d2. Or, the proportion of d2' to d2 can be adjusted according to the transmittance ratio of the red filter unit 126R to green filter unit 126G, and the transmittance ratio of the blue filter unit 126B to the green filter unit 126G. For example, if the transmittance ratio of the red filter unit 126R to green filter unit 126G is larger than that of the blue filter unit 126B to green filter unit 126G, the width d2 can be adjusted to be slightly smaller than the width d2'. Through the present embodiment, the width of the black matrix units 125a and 125b that locate on the left and right side of the green filter unit 126G respectively can be widened, and thus the problem of color shift at large viewing angles at the right and left viewing angles can be improved.

Figure 5:
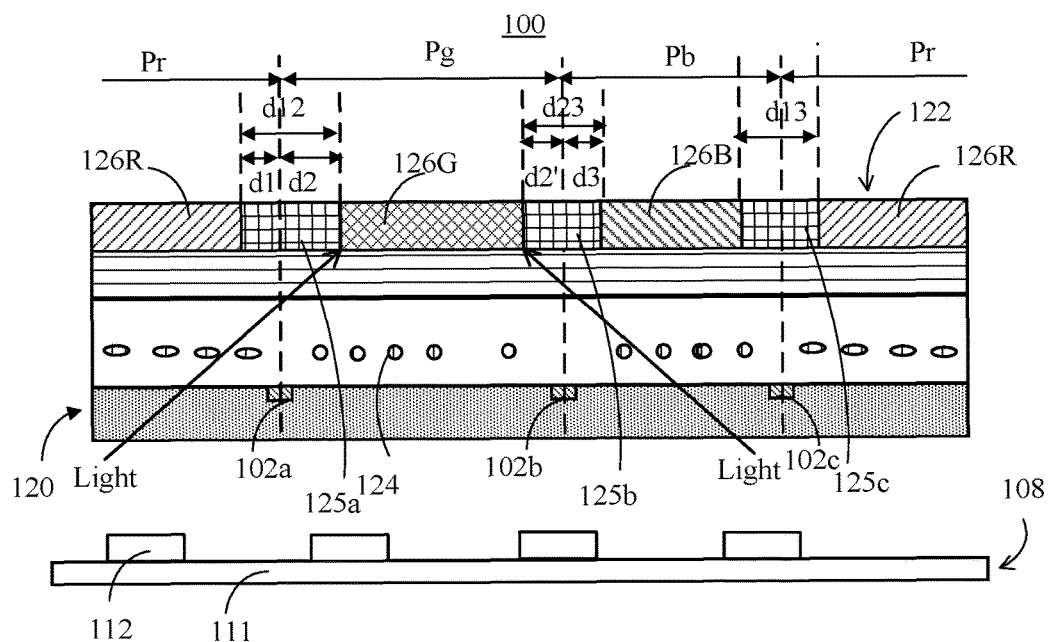
FIG. 5 is a cross-sectional view of the LCD of a fourth embodiment of the present invention.

Please refer to FIG. 5. FIG. 5 is a cross-sectional view of the LCD 100 of a fourth embodiment of the present invention. Items in FIG. 5 marked with numbers the same as those in FIG. 2 to FIG. 4 have the same functions, so no further explanation is provided here. The width d2 of the black matrix unit 125a facing the green filter unit 126G (or the white filter unit 126W) is larger than the width d1 of the black matrix unit 125a facing the red filter unit 126R. The width d2' of the black matrix unit 125b facing the green filter unit 126G (or the white filter unit 126W) is larger than the width d3 of the black matrix unit 125b facing the blue filter unit 126B. In addition, in the fourth embodiment, the area of the green filter unit 126G (or the white filter unit 126W) is larger than that of the red filter unit 126R (or the blue filter unit 126B). More specifically, a distance Pg between the center line of the first data line 102a and the center line of the second data line 102b is larger than a distance Pb between the center line of the second data line 102b and the center line of the third data line 102c. Or, the distance Pg between the center line of the first data line 102a and the center line of the second data line 102b is larger than a distance Pr between the center line of the first data line 102a and the center line of the third data line 102c. The present embodiment not only changes the width of the black matrix units 125a or 125b or both, which locate on either side of the green filter unit 126G (or the white filter unit 126w), but also increases the area of the green filter unit 126G (or the white filter unit 126W), so to maintain the aperture ratio of the green filter unit 126G (or the white filter unit 126W). In other words, the present invention not only improves color shift at large viewing angles, but also maintains the aperture ratio of the pixels.

Figure 6:
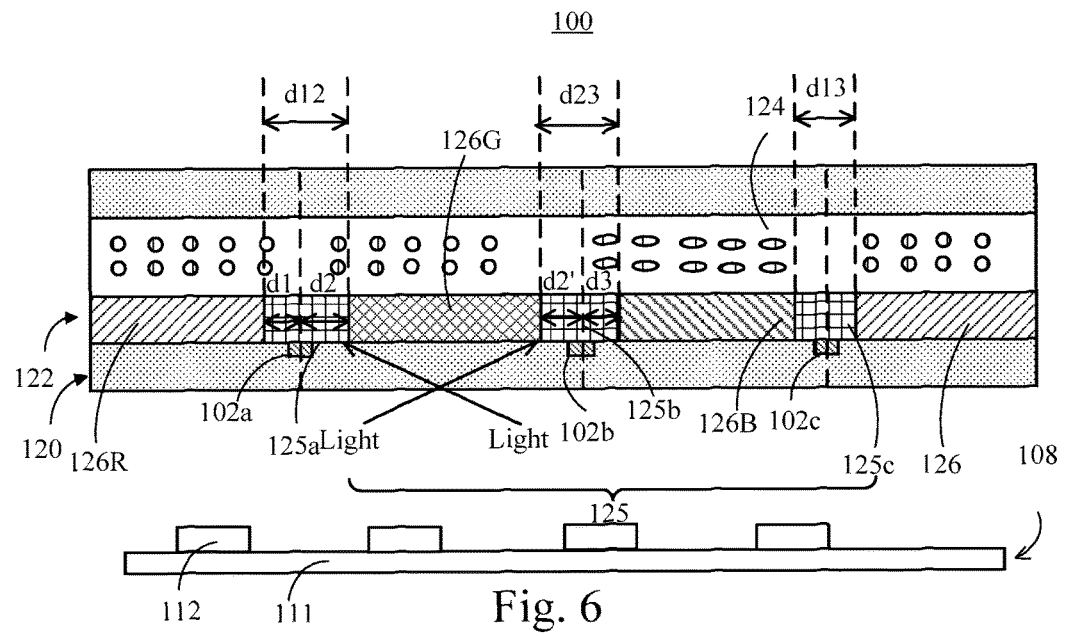
FIG. 6 shows a cross-sectional view of the LCD of a fifth embodiment of the present invention.

Please refer to FIG. 6. FIG. 6 shows a cross-sectional view of the LCD 100 of a fifth embodiment of the present invention. Items in FIG. 6 marked with numbers the same as those in FIG. 2 have the same functions, so no further explanation is provided here. The black matrix layer 125 is disposed between the array substrate 120 and liquid crystal layer 124. The black matrix layer 125 comprises a plurality of black matrix units—black matrix units 125a, 125b and 125c. The black matrix unit 125a connects between the green filter unit 126G and red filter unit 126R and aligns to the data line 102a. The black matrix unit 125b connects between the green filter unit 126G and blue filter unit 126B and aligns to the data line 102b. The black matrix unit 125c connects between the red filter unit 126R and blue filter unit 126B and aligns to the data line 102c. The width d12 of the black matrix unit 125a is larger than the width d13 of the black matrix unit 125c, or the width d23 of the black matrix unit 125b is larger than the width d13 of the black matrix unit 125c. In the present embodiment, the black matrix unit 125a bases on the center line of the data line 102a to which it aligns to. The width d2 of the black matrix unit 125a facing the green filter unit 126G is larger than the width d1 of the black matrix unit 125a facing the red filter unit 126R. The back matrix unit 125b aligns to the center line of the data line 102b. The width d2' of the black matrix unit 125b facing the green filter unit 126G is larger than the width d3 of the black matrix unit 125B facing the blue filter unit 126B. The width d2 of the black matrix unit 125a is larger than the width d1, therefore it is easier for the black matrix unit 125a to block the light that comes from the liquid crystal molecules above the red filter unit 126R and to be output through the green filter unit 126G from the large viewing angle, so that the light cannot pass through the green filter unit 126G. At this moment, the red images viewers see at the large viewing angle are doped with little green light and are purely red images. Similarly, because the width d2' of the black matrix unit 125b is larger than the width d3, the light that passes through the green filter unit 126G is less. Thus it is easier for the black matrix unit 125b to block the light that comes from the liquid crystal molecules above the blue filter unit 126B and to be output through the green filter unit 126G from the large viewing angle, so that the light cannot pass through the green filter unit 126G. Therefore, the blue images that viewers see at the large viewing angle are doped with little green light and are purely blue images.

The green filter unit 126G in the present embodiment can be substituted by the white filter unit. The principle and deployment method is the same as that of the embodiment shown in FIG. 3, so no more explanation is provided here.

Similarly, the area of the green filter unit 126G (or the white filter unit 126W) is smaller than that of the red filter unit 126R (or the blue filter unit 126B). More specifically, a distance Pg between the center line of the first data line 102a and the center line of the second data line 102b is shorter than a distance Pb between the center line of the second data line 102b and the center line of the third data line 102c. Or, the distance Pg between the center line of the first data line 102a and the center line of the second data line 102b is shorter than a distance Pr between the center line of the first data line 102a and the center line of the third data line 102c.

Figure 7:
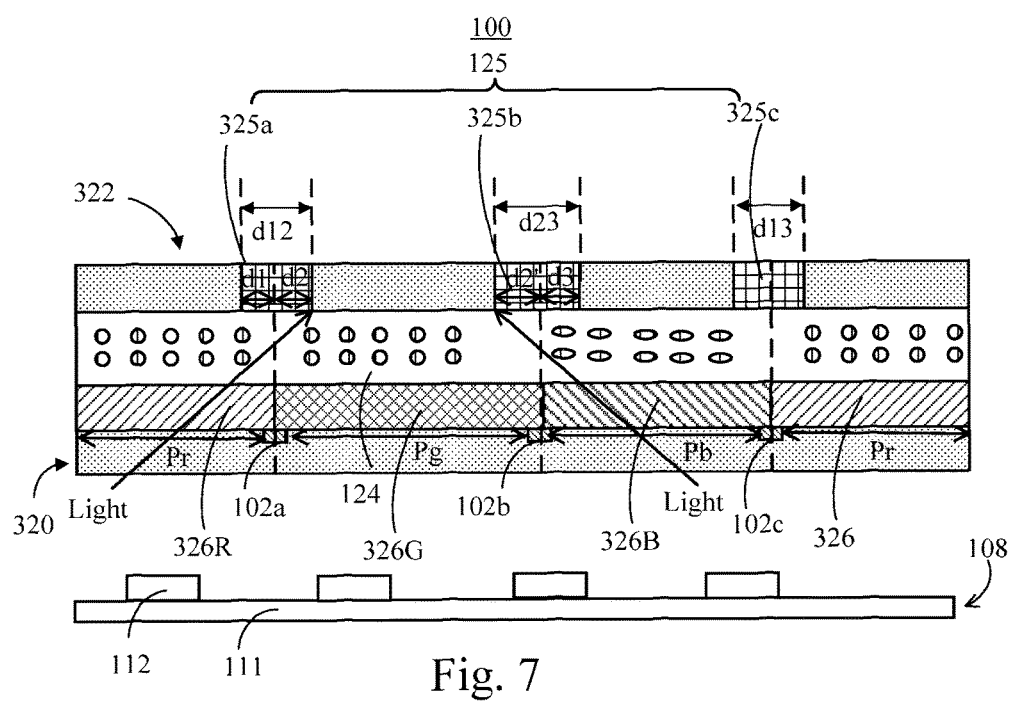
FIG. 7 is a cross-sectional view of the LCD of a sixth embodiment of the present invention.

Please refer to FIG. 1 and FIG. 7. FIG. 7 is a cross-sectional view of the LCD 100 of a sixth embodiment of the present invention. Items in FIG. 7 marked with numbers the same as those in FIG. 2 have the same functions, so no further explanation is provided here. A color film layer 326 is disposed on an array substrate 320, and a liquid crystal layer 124 is disposed on the color film layer 326. A black matrix layer 325 is disposed on the liquid crystal layer 124 to prevent light leakage. The color film layer 326 can comprise a red filter unit 326R, green filter unit 326G and blue filter unit 326B. The green filter unit 326G connects between the red filter unit 326R and blue filter unit 326B. A LCD panel 306 separates the light into three primary colors—red, green and blue—through the red filter unit 326R, green filter unit 326G and blue filter unit 326B, so to show color images. The black matrix layer 325 comprises a plurality of black matrix units, such as a first black matrix unit 325a, a second black matrix unit 325b and a third black matrix unit 325c. The first black matrix unit 325a locates at the joint of the green filter unit 326G and the red filter unit 326R, and aligns to the data line 102a. The second black matrix unit 325b locates at the joint of the green filter unit 326G and the blue filter unit 326B, and aligns to the data line 102b. The third black matrix unit 325c locates at the joint of the red filter unit 326R and the blue filter unit 326B and aligns to the data line 102c. The width d12 of the first black matrix unit 325a and the width d23 of the second black matrix unit 325b is larger than the width d13 of the third black matrix unit 325c. The width d2 of the black matrix unit 325a facing the green filter unit 326G is larger than the width d3 of the black matrix unit 325a facing the red filter unit 326R. The black matrix unit 325b bases on the center line of the data line 302b to which it aligns to. The width d2' of the black matrix unit 325b facing the green filter unit 326G is larger than the width d3 of the black matrix unit 325b facing the blue filter unit 326B. Given that the transmittance ratio of the red filter unit 326R to green filter unit 326G is larger than that of the blue filter unit 326B to green filter unit 326G, the width d2 can be adjusted to be slightly smaller than the width d2'.

The green filter unit 326G in the present embodiment can be substituted by the white filter unit. The principle and deployment method is the same as that of the embodiment shown in FIG. 3, so no more explanation is provided here.

The size of the green filter unit 326G (or a white filter unit 326W) shown in FIG. 7 can be larger than that of the red filter unit 326R (or the blue filter unit 326B). More specifically, a distance Pg between the center line of the first data line 102a and the center line of the second data line 102b is larger than a distance Pb between the center line of the second data line 102b and the center line of the third data line 102c. Or, the distance Pg between the center line of the first data line 102a and the center line of the second data line 102b is larger than a distance Pr between the center line of the first data line 102a and the center line of the third data line 102c.

In another embodiment, a top black matrix layer and bottom black matrix layer can be disposed respectively on the opposite sides of the liquid crystal layer 124. The design of the black matrix layer shown in FIG. 7 can be applied to the deployment of the top black matrix layer, and the design of the black matrix layer and color filter layer shown in FIG. 6 can be applied to the deployment of the bottom black matrix layer.

Comparing to current technology, the present invention provides a LCD with an asymmetrical black matrix layer. The width of the black matrix unit on both sides of the filter unit of high transmittance rate (e.g. green or white filter unit) is larger than that of the black matrix unit between two filter unit of low transmittance rate (e.g. red or blue filter unit).

More specifically, when the asymmetrical black matrix layer locates on the side that is away from the backlight module (i.e. close to viewers), the width of the black matrix unit facing the filter unit of high transmittance rate is larger than that of the black matrix unit facing the filter unit of low transmittance rate. When the asymmetrical black matrix layer locates on the side that is closer to the backlight module (i.e. away from viewers), the width of the black matrix unit facing the filter unit of low transmittance rate is larger than that of the black matrix unit facing the filter unit of high transmittance rate. This kind of asymmetrical black matrix layer not only best prevents lowering the pixel aperture ratio, but also improves color shift of images when light goes through pixels of low transmittance as pixels of high transmittance are turned off.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal display (LCD), comprising:
   a backlight module for emitting light;
   an array substrate disposed on the backlight module, comprising a plurality of data lines, comprising a first data line, a second data line and a third data line for transmitting data signals;
   a black matrix layer for preventing light leakage;
   a liquid crystal layer, disposed between the black matrix layer and the array substrate, comprising liquid crystal molecules for controlling the twist of liquid crystal molecules based on the data signals; and
   a color filter layer, comprising:
      a first filter unit, for producing light of a first color when light passes through;
      a second filter unit, for producing light of a second color when light passes through, of transmittance rate larger than that of the first filter unit;
      a third filter unit, for producing light of a third color when light passes through, of transmittance rate larger than that of the first filter unit;
   wherein the black matrix layer comprises:
      a first black matrix unit, corresponding to the joint of the first and second filter units;
      a second black matrix unit, corresponding to the joint of the second and third filter units;
      a third black matrix unit, corresponding to the joint of the first and third filter units; the width of the first black matrix unit is larger than that of the third black matrix unit,
      wherein the width of the second black matrix unit is larger than that of the third black matrix unit, and the width of the first black matrix unit is larger than that of the second black matrix unit,
      wherein the first filter unit is a red filter unit, the second filter unit is a green or white filter unit, and the third filter unit is a blue filter unit.

2. The LCD of claim 1, wherein the first black matrix unit aligns to a first data line and bases on the center line of the first data line, and the width of the first black matrix unit facing the second filter unit is larger than that facing the first filter unit.

3. The LCD of claim 1, wherein the second black matrix unit aligns to a second data line and bases on the center line of the second data line, and the width of the second black matrix unit facing the second filter unit is larger than that facing the third filter unit.

4. The LCD of claim 1, wherein the first black matrix unit connects between the first and second filter units, the second black matrix unit connects between the second and third filter units, and the third black matrix unit connects the first and third filter units.

5. The LCD of claim 1, wherein the first black matrix unit faces but does not contact the joint of the first and second filter units, the second black matrix unit faces but does not contact the joint of the second and third filter units, and the third black matrix unit faces but does not contact the joint of the first and third filter units.

6. A liquid crystal display (LCD), comprising:
   a backlight module for emitting light;
   an array substrate disposed on the backlight module, comprising a plurality of data lines, comprising a first data line, a second data line and a third data line for transmitting data signals;
   a black matrix layer for preventing light leakage;
   a liquid crystal layer, comprising liquid crystal molecules, for controlling the twist of liquid crystal molecules based on the data signals; and
   a color filter layer, comprising:
      a first filter unit, for producing light of a first color when light passes through;
      a second filter unit, for producing light of a second color when light passes through, of transmittance rate larger than that of the first filter unit;
      a third filter unit, for producing light of a third color when light passes through, of transmittance rate larger than that of the first filter unit;
   wherein the black matrix layer comprises:
      a first black matrix unit, corresponding to the joint of the first and second filter units;
      a second black matrix unit, corresponding to the joint of the second and third filter units;
      a third black matrix unit, corresponding to the joint of the first and third filter units; the width of the first black matrix unit is larger than that of the third black matrix unit,
      wherein the first filter unit is a red filter unit, the second filter unit is a green or white filter unit, and the third filter unit is a blue filter unit, and
      wherein the width of the second black matrix unit is larger than that of the third black matrix unit, and the width of the first black matrix unit is larger than that of the second black matrix unit.

7. The LCD of claim 6, wherein the liquid crystal layer is disposed between the black matrix layer and the array substrate.

8. The LCD of claim 6, wherein the first black matrix unit aligns to a first data line and bases on the center line of the first data line, and the width of the first black matrix unit facing the second filter unit is larger than that facing the first filter unit.

9. The LCD of claim 6, wherein the second black matrix unit aligns to a second data line and bases on the center line of the second data line, and the width of the second black matrix unit facing the second filter unit is larger than that facing the third filter unit.

10. The LCD of claim 6, wherein the first black matrix unit connects between the first and second filter units, the second black matrix unit connects between the second and third filter units, and the third black matrix unit connects the first and third filter units.

11. The LCD of claim 6, wherein the first black matrix unit faces but does not contact the joint of the first and second filter units, the second black matrix unit faces but does not contact the joint of the second and third filter units, and the third black matrix unit faces but does not contact the joint of the first and third filter units.

12. The LCD of claim 6, wherein the black matrix layer is disposed between the liquid crystal layer and the array substrate.

\* \* \* \* \*